Figure 1:
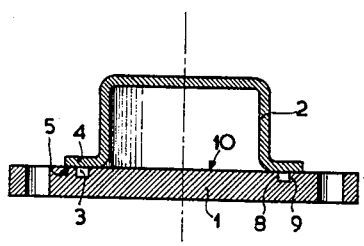

March 21, 1961 W. A. ROOVERS 2,975,928
METHOD OF JOINING TWO METAL PARTS IN A VACUUM-TIGHT MANNER
AND OBJECT MANUFACTURED BY THE USE OF SUCH METHOD
Filed Oct. 1, 1957

INVENTOR
WILHELMUS ANTONIUS ROOVERS
BY
Frank R. Trifan
AGENT

United States Patent Office 2,975,928
Patented Mar. 21, 1961

2,975,928

METHOD OF JOINING TWO METAL PARTS IN A VACUUM-TIGHT MANNER AND OBJECT MANUFACTURED BY THE USE OF SUCH METHOD

Wilhelmus Antonius Roovers, Nijmegen, Netherlands, assignor to North American Philips Company, Inc., New York, N.Y., a corporation of Delaware Filed Oct. 1, 1957, Ser. No. 687,482

Claims priority, application Netherlands Nov. 23, 1956

4 Claims. (Cl. 220—2.3)

It is known that two metal parts may be joined in a vacuum-tight manner without the use of heating, if these parts are provided with two adjacent surfaces and, at least at these surfaces, consist of comparatively soft metal, such as copper, aluminum or silver, and subsequently, after cleaning of the surfaces, are brought into contact with each other and pressed together by means of a press in a direction approximately at right angles to their contact surfaces with a force such that strong flowing of the material transverse to the direction of pressing occurs. This method has previously been suggested for use in the manufacture of vacuum-tight envelopes for discharge tubes and semi-conductive devices, such as transistors and crystal diodes.

The known method has the disadvantage that the parts must undergo very strong deformation in order to obtain a vacuum-tight joint since they must be reduced to approximately 20% of their initial thickness at their junction and this, of course, involves considerable displacement of material transverse to the direction of pressing. This strong deformation makes it substantially impossible to establish the junction in a manner other than between two projecting edges or flanges. Another disadvantage is that exact dimensions are difficult to realise. Furthermore, the parts are required to be thoroughly cleaned beforehand.

The present invention, which relates more particularly to joining two metal parts in a vacuum-tight manner, which parts are provided with two adjacent surfaces and united by pressure, has for its purpose inter alia to obviate these disadvantages.

According to the invention, the parts consist at least at their adjacent or contacting surfaces (hereinafter referred to as press surfaces), of comparatively hard metal and comparatively soft metal, respectively, the surface on the harder metal being provided with at least one groove having side-walls approximately at right angles to this surface, the parts being pressed together so strongly at these surfaces that the soft metal fills the groove or grooves.

The pressing operation is preferably so strong that the edges of the groove are slightly pressed towards each other.

In order to obtain satisfactory results, the relative hardness of the one metal with respect to the other is important, naturally apart from requirements which must be imposed upon such materials from a general technical point of view. For the sake of simplicity, reference will be made hereinafter to hard metal and soft metal. The latter must be so soft, that, during pressing, it fills the groove in the hard metal completely or substantially before the groove itself is deformed. Hard metals are in practice all metals having a hardness greater than 120 V.P.N. (Vicker's Pyramidal Number). The soft metals used are preferably those having a hardness smaller than 60 V.P.N. As a rule, if the one metal is harder, the other metal can or must also be harder. It will be evident that these metals must furthermore satisfy the usual requirements imposed upon materials for the objects concerned. The first part may consist wholly of hard metal, but the press surface and the groove may alternatively be provided on a section thereof consisting of hard metal. The press surface of soft metal may also be provided on a section of the second part which otherwise consists of a different metal. It is preferable to provide the press surface of soft metal on a flange, so that a die of a press may readily be placed thereon.

A vacuum-tight envelope may be manufactured by joining two parts or in certain cases more than two parts in the above-described manner.

In order that the invention may be readily carried into effect, several embodiments will now be described more fully, by way of example, with reference to the accompanying drawing.

Figure 9:
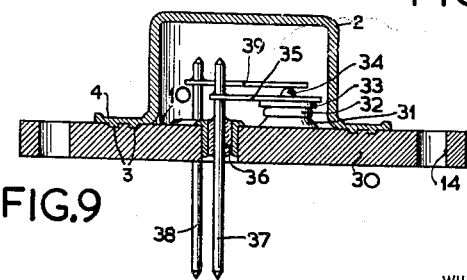

All figures show diagrammatic sections of envelope for semi-conductor devices, such as transistors, in which the inner parts are omitted, except in Fig. 9.

The envelope shown in Fig. 1 comprises an iron base 1 and a cap 2 of soft copper. A circular groove 3 is milled in the rim of the base plate 1 and the cap 2 is provided with a flange 4 having a surface 5 adjacent the base 1.

Figure 2:
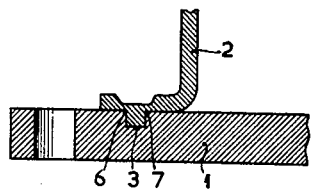

The two parts are united with the use of a single tubular die which partly presses the material of the flange into the groove 3, as shown in Fig. 2. Although it is probable that, for obtaining a vacuum-tight joint, the surfaces to be joined are required to be very clean, for example free from oxide films, it has been found when using the present method that cleaning of the surfaces is not necessary. This is probably attributable to the fact that the soft metal upon flowing over the edges of the groove indicated by 6 and 7 in Fig. 2, is freed of surface contaminations. Of course, this does not imply that material contamination, for example a thick oxide or fat layer, would not be harmful.

The shape of the groove has been found to be not very critical. Satisfactory results are obtained with a square section having sides of 0.5 mm.

It has previously been mentioned that the side-walls 8 and 9 (see Fig. 1) of the groove must be substantially at right angles to the press surface 10. The bottom of the groove is allowed to be a little narrower than the width of the groove at its upper side, except to an extent such that the soft metal is not properly clamped in position. Consequently, the shape of the groove must be such as to hold the material. On the other hand, the bottom of the groove is allowed to be wider than the width at its upper side, but such a groove is more difficult to manufacture.

Figure 3:
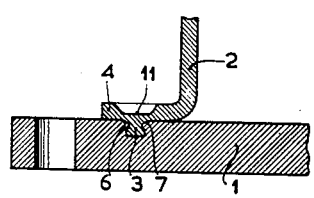

The pressure used is preferably such that the edges 6 and 7 of the groove 3 are slightly pressed towards each other, as shown in Fig. 3. This desired effect is enhanced due to the hardness of most metals increasing during pressing. The material of a flange of soft copper thus initially flows readily into the groove, thereafter the remaining thin portion of the flange 4, as indicated by 11 in Fig. 3, has sufficiently hardened to press the edges 6 and 7 a little towards each other.

The method according to the invention makes it very simple for a part of soft metal having a flange to be secured in a vacuum-tight manner to the surface of a part of hard metal having a groove.

Some further examples thereof are shown in the following figures.

Figure 4:
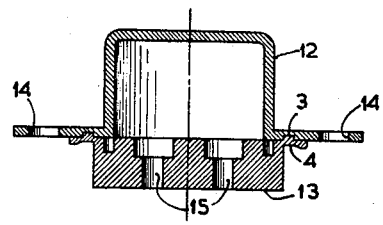

The transistor envelope shown in Fig. 4 comprises a steel cap 12 and a copper base 13. A groove 3 is milled in the edge of the cap 12 and the base 13 has a flange 4. The cap 12 also comprises two perforated lugs 14, by means of which the transistor may be secured to a carrier plate. The base has two bores 15, in which vacuum-tight lead-through insulators for supply wires to the semi-conductive system (not shown) may be soldered. This construction affords the advantage that the copper base 13 dissipates the heat very well, while the steel cap permits the system to be firmly screwed or pressed in another manner on a mounting plate.

Figure 5:
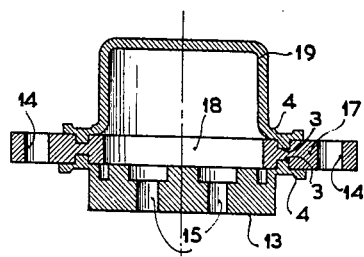

The envelope shown in Fig. 5 comprises an iron plate 17 which has a central aperture 18 and is provided with grooves 3 on either side. A copper base 13 is secured to the lower side of the plate 17 and a copper cap 19 is arranged on its upper surface. This construction yields a limitation of the amount of hard metal in the envelope and thus permits an even better dissipation of heat, since soft metals, such as copper, aluminum and silver, usually have a very high thermal conductivity.

Figure 6:
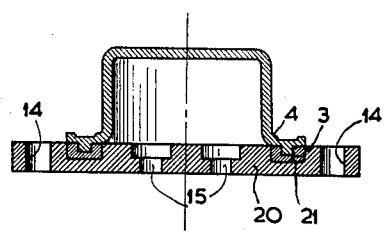

A further limitation of the use of hard metal is shown in Fig. 6. The envelope shown in this figure has a copper base 20, in which an iron ring 21 having a groove 3 is fixed in position. The flange 4 of a copper cap 19 is secured on the press surface of the ring 21.

Figure 7:
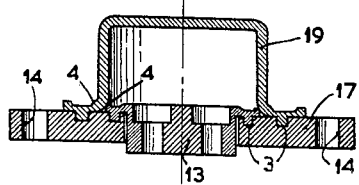

Fig. 7 shows a variant of the construction of Fig. 5. The upper side of the iron plate 17 has two concentric grooves 3, in the inner of which the flange 4 of the copper base 13 and in the outer of which the flange of the cap 19 is pressed in position.

Figure 8:
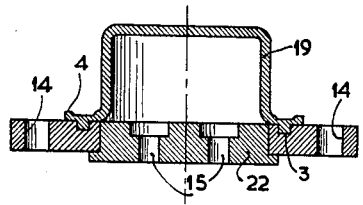

The envelope shown in Fig. 8 comprises, as before, an iron plate 17 having a central aperture 18, in which a copper base 22 is soldered in position. The upper surface of the iron plate 17 has a groove 3, in which the flange 4 of the copper cap 19 is pressed in position.

The invention is not limited to the use of a single groove for joining two parts. More particularly if one of these parts is very thin, it may be advantageous to utilize, for example, two grooves. An envelope for a transistor having such a joint is shown in Fig. 9.

This transistor comprises an iron base 30, whose rim has two attachment lugs 14 and the upper surface 10 of which has two concentric grooves 3. The copper cap 2 has a flange 4, which is pressed in position in these grooves and thus becomes permanently bonded to the base 30.

The base 30 also has an elevation 31, the upper surface of which has been successively copper-plated and gold-plated. A thin disc of germanium 33 is secured thereto by means of a quantity of indium 32. The upper side of the disc 33 has melted on it an electrode 34, likewise of indium, which is surrounded by a thin perforated nickel plate 35 soldered to the germanium with the use of tin.

Two apertures 15, in which lead-through insulators 36 are soldered, are drilled in the base 30. The insulators 36 carry two contact pins 37 and 38, the first of which is connected at the interior of the transistor to the nickel plate 35, which is active as a base contact, and the second of which is connected by means of a nickel plate 39 to the electrode 34, which is active as an emitter. The envelope itself constitutes the connection for the collector formed by the indium 32.

It will be evident that many structural variations are possible within the scope of the invention.

What is claimed is:

1. A semiconductor encapsulating device comprising first and second housing members having, respectively, first and second metallic flanges extending outwardly therefrom and overlying and contacting one another and press-joined together forming a self-sustaining vacuum-tight bond to enclose a semiconductor body between the housing members, one of said flanges being constituted of a relatively soft metal, the contacting surface of the other flange being constituted of relatively hard metal and containing a groove whose side walls extend approximately at right angles to the said surface, soft metal of and integral with said one flange substantially filling the said groove and contacting the said side walls and having been pressed therein by the application of pressure alone.

2. A semiconductor encapsulating device comprising first and second housing members having, respectively, first and second annular metallic flanges extending outwardly therefrom and overlying and contacting one another and press-joined together forming a self-sustaining vacuum-tight bond to enclose a semiconductor body between the housing members, one of said flanges being constituted of a relatively soft metal having a hardness less than 60 V.P.N., the contacting surface of the other flange being constituted of relatively hard metal with a hardness greater than 120 V.P.N. and containing a single annular groove whose side walls extend approximately at right angles to the said surface, soft metal of and integral with said one flange substantially filling the said groove and contacting the said side walls and having been pressed therein by the application of the pressure alone, the portions of the groove side walls adjacent the surface being slightly bent inward to lock within the groove the said soft metal.

3. A method of encapsulating a semiconductor device within first and second housing members having, respectively, first and second metallic flanges extending outwardly therefrom, one of said flanges being of relatively soft metal, the other of said flanges having a surface of relatively hard metal and containing in the said surface a groove whose side walls extend approximately at the right angles to the said surface, comprising juxtaposing the two housing members and placing the soft metal flange over and in contact with the surface of hard metal containing the groove and providing the semiconductor device within the juxtaposed housing members, and applying pressure only to the flanges in a direction substantially at right angles to the hard metal surface and of such a magnitude that soft metal from the said one flange flows into and fills the said groove in the other flange forming a cold-pressed vacuum-tight bond therebetween.

4. A method of encapsulating a semiconductor device within first and second housing members having, respectively, first and second annular metallic flanges extending outwardly therefrom, one of said flanges being of relatively soft metal whose hardness is less than 60 V.P.N., the other of said flanges having a surface of relatively hard metal whose hardness is greater than 120 V.P.N. and containing in the said surface a single annular groove whose side walls extend approximately at right angles to the said surface, comprising juxtaposing the two housing members and placing the soft metal flange over and in contact with the surface of hard metal containing the groove and providing the semiconductor device within the juxtaposed housing members, and applying pressure only to the flanges in a direction at right angles to the contacting surfaces at a portion thereof overlying the groove and of such a magnitude that soft metal from the said one flange flows into and fills the said groove in the other flange and the groove edges are bent inwardly forming a cold-pressed vacuum-tight bond therebetween.

References Cited in the file of this patent

UNITED STATES PATENTS

| | | |
|---|---|---|
| 2,132,796 | Money | Oct. 11, 1938 |
| 2,472,865 | Stutsman | June 14, 1949 |
| 2,527,127 | Gormley et al. | Oct. 24, 1950 |
| 2,532,874 | Anderson | Dec. 5, 1950 |
| 2,533,512 | Samuel | Dec. 12, 1950 |
| 2,617,850 | Charmichael | Nov. 11, 1952 |
| 2,701,483 | Foxon et al. | Feb. 8, 1955 |